(12) United States Patent
Passarotto

(10) Patent No.: US 6,709,066 B2
(45) Date of Patent: Mar. 23, 2004

(54) ANTI-FRICTION BEARING INTERPOSABLE AT THE CROSSING-OVER POINT BETWEEN TWO SPOKES OF A BICYCLE WHEEL

(75) Inventor: Maurizio Passarotto, Rovigo (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 10/210,963

(22) Filed: Aug. 2, 2002

(65) Prior Publication Data
US 2003/0067214 A1 Apr. 10, 2003

(30) Foreign Application Priority Data
Aug. 3, 2001 (IT) .................................. TO2001A0783

(51) Int. Cl.[7] .............................. B60B 1/00; B60B 7/00
(52) U.S. Cl. ..................................... 301/104; 301/37.41
(58) Field of Search ...................... 301/37.101, 37.41, 301/55, 61, 104; 324/174

(56) References Cited

U.S. PATENT DOCUMENTS

| | | | |
|---|---|---|---|
| 343,959 A | * | 6/1886 | Latta |
| 1,950,082 A | | 3/1934 | Farr |
| 3,995,938 A | * | 12/1976 | Olson .................. 301/37.41 X |
| 6,188,215 B1 | * | 2/2001 | Muraoka et al. ........ 301/104 X |
| 6,339,323 B1 | * | 1/2002 | Muraoka ............. 301/37.41 X |

FOREIGN PATENT DOCUMENTS

| | | | |
|---|---|---|---|
| DE | 582991 | 8/1933 | |
| DE | 3226357 | 1/1984 | |
| EP | 1031502 | 8/2000 | |
| EP | 1043177 | 10/2000 | |
| GB | 3443 | * 11/1902 | .................. 301/55 |

* cited by examiner

Primary Examiner—Russell D. Stormer
(74) Attorney, Agent, or Firm—Volpe and Koenig, P.C.

(57) ABSTRACT

An anti-friction bearing interposable at the crossing-over point between two spokes of a bicycle wheel comprises a body having a through hole, with a completely closed continuous part, and giving out onto two opposite ends of the body to receive through it one of the two spokes. The body further includes a portion of external surface in contact with the other spoke.

22 Claims, 2 Drawing Sheets

Fig_1
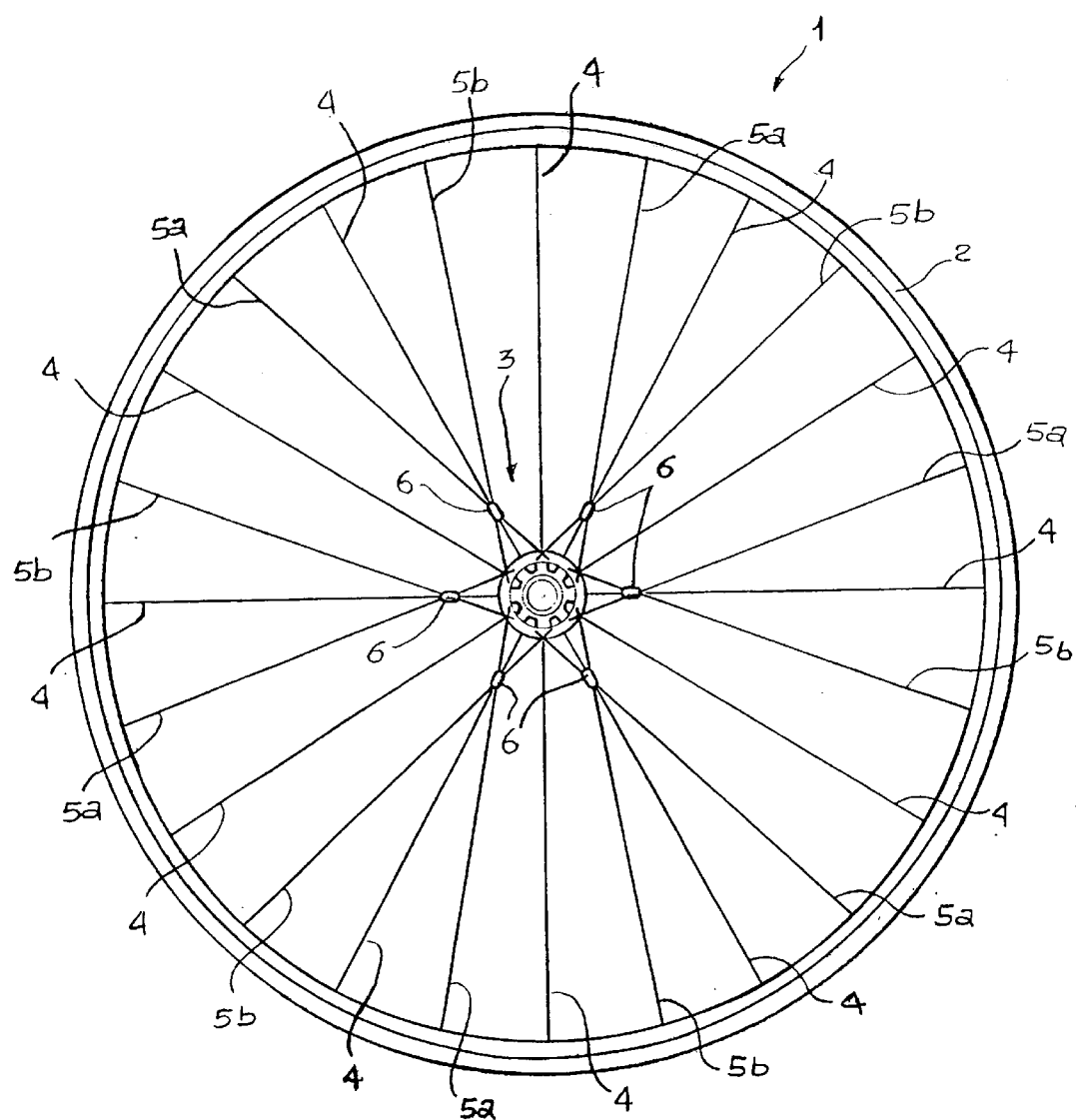

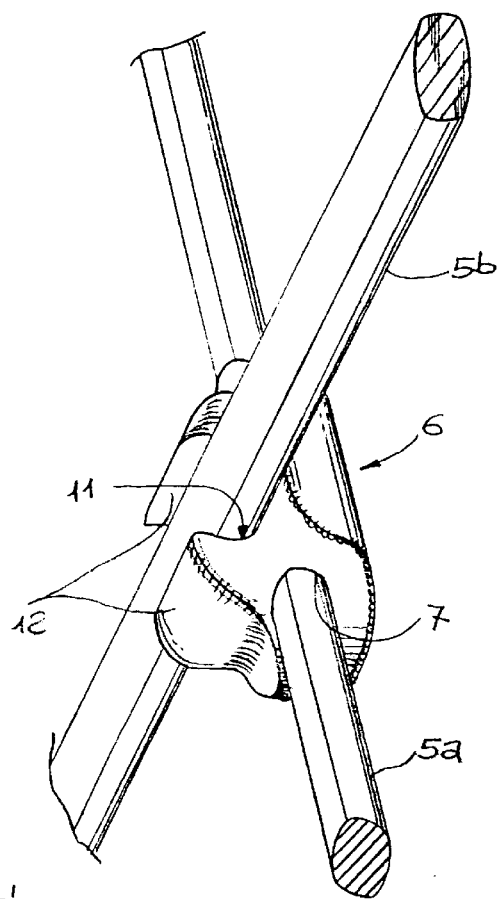
Fig_2
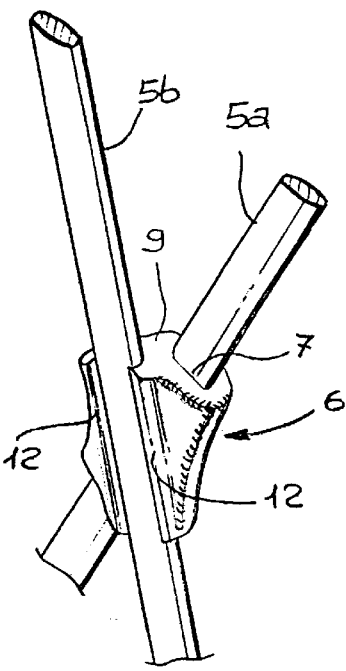
Fig_3
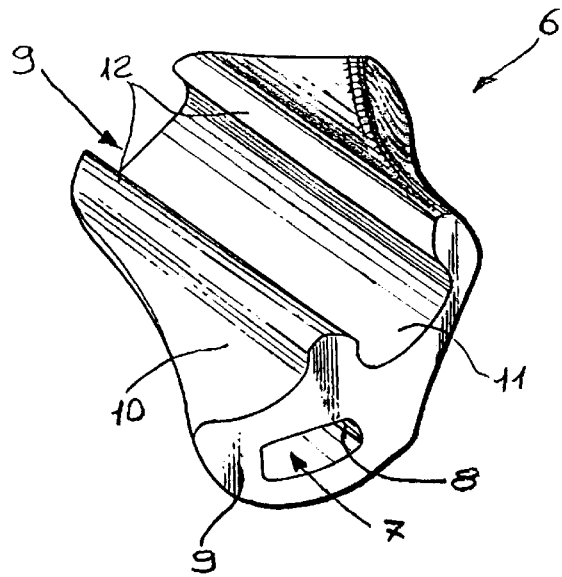
Fig_4

ANTI-FRICTION BEARING INTERPOSABLE AT THE CROSSING-OVER POINT BETWEEN TWO SPOKES OF A BICYCLE WHEEL

FIELD OF INVENTION

The present invention relates generally to the field of spoked bicycle wheels and, in particular, an anti-friction bearing interposed at the crossing-over point between two spokes of a bicycle wheel.

BACKGROUND

There have already been proposed for some time spoked bicycle wheels, in which at the crossing-over point of at least one pair of spokes there is set a support. One solution of this type is, for example, known from the German patent application DE-A-3 226 357, published on Jan. 19, 1984. The body set at the crossing-over point between two spokes has normally been used in the past for supporting, for instance, a permanent magnet designed to co-operate with a sensor carried by the fork of the bicycle for detecting the speed of rotation of the wheel. Another support of the type presented above is described in EP-A-1 031 502.

The above-mentioned support envisages a body provided with a groove, designed to fit, by snap action, on a spoke. The fitting of a grooved body on the spoke of a bicycle wheel is, on the other hand, well-known in the prior art (see, for example, the German patent DE-C-0 582 991, published on Aug. 10, 1933). A further solution of a body provided with two grooves on two opposite faces for mounting between two spokes in the area in which they cross over one another is known from EP-A-1 043 177.

SUMMARY

The purpose of the present invention is to provide an inexpensive bearing having a simplified structure that can be set between the cross-over point of two spokes of a bicycle wheel with a more stable anchorage.

The bearing is characterized by a body having at least one through hole to receive one of the aforesaid two spokes and an external portion configured for contact with the other spoke.

The bearing according to the invention does present the need to be fitted over a respective spoke before that spoke is completely mounted on the wheel. This drawback in the installation phase is, however, largely compensated for by excluding the possibility of separation of the bearing.

A bearing according to the present invention could be made in tubular form to be fitted on one of the two spokes and having an external surface in contact with the other spoke.

In the preferred embodiment of the present invention, the external-surface is configured with a complementer longitudinal groove direction inclined with respect to the axis of the aforesaid through hole by an angle corresponding to the angle at which the two spokes cross one another.

Preferably, the aforesaid bearing is made of plastic or elastomeric material. It can thus function as an anti-friction and anti-noise material by preventing direct rubbing between the two spokes, which may occur as the bicycle is travelling.

The present invention contemplates a spoked wheel comprising a plurality of pairs of spokes that cross one another and a bearing of the type described above set at the point of crossing-over of one or more pairs of spokes.

BRIEF DESCRIPTION OF THE DRAWING(S)

Further characteristics and advantages of the present invention will emerge from the ensuing description, with reference to the attached drawings, which are provided purely by way of non-limiting example, and in which:

FIG. 1 is a front view of an example of a wheel having bearings according to the invention;

FIG. 2 is an enlarged perspective view of a bearing according to the invention mounted between two spokes;

FIG. 3 is a rotated perspective view of the bearing mount illustrated in FIG. 2; and FIG. 4 is a perspective view of a bearing according to the invention.

DETAILED DESCRIPTION OF THE PREFERRED EMBODIMENT(S)

In FIG. 1, the reference number 1 designates as a whole a spoked bicycle wheel comprising a rim 2 connected to a hub 3 by means of a plurality of spokes. In particular, the example illustrated shows a wheel having a plurality of spaced apart spokes 4 radially disposed on one side and, on the other side, a plurality of pairs of spokes 5a, 5b, which cross one another. A bearing 6 is disposed in the area in which the spokes cross, between each pair of spokes 5a, 5b.

As may be seen in FIGS. 2 to 4, the bearing 6 is preferably a one-piece body made of plastic or elastomeric material, for example rubber. The bearing 6 has a through hole 7 between the opposite faces 9 (only one face is visible in the figure). In the example illustrated, the spokes 5a, 5b have a flatter cross-section, which is basically ellipsoidal. Consequently, the through hole 7 has a profile of similar or complementary cross section.

In addition, once again in the case of the preferred embodiment of the invention, the body 6 has a portion 10 in which there is formed a groove 11 and elastically deformable inwardly disposed ribs (12). The ribs 12 define the depth of groove 11 to enable snap-action mounting of the spoke 5b within the groove 11. The profile of groove 11 corresponds to the profile of the spoke 5b. It is evident, however, that for the purposes of the present invention, the presence of the groove 11 is not essential, it being possible for the body 6 to have a surface portion 10 without groove simply in contact with the spoke 5b. In the case of the embodiment illustrated, the groove 11 has a longitudinal direction inclined with respect to the axis of the through hole 7 by an angle corresponding to the angle at which the two spokes 5a, 5b cross over one another, as is clearly visible in FIG. 3.

For mounting of the bearing according to the invention, it is necessary to slide the body 6 over one end of a spoke 5a before the latter is mounted on the wheel. The bearing 6 can then be made to slide along the spoke 5a until it is set in the area where the spoke 5a crosses over the respective spoke 5b.

As the bicycle is travelling, the body 6 functions as an anti-friction and anti-noise element. Its anchorage to the spoke 5a is completely ensured.

Of course, without prejudice to the principle of the invention, the details of construction and the embodiments may vary widely with respect to what is described and illustrated purely by way of example, without thereby departing from the scope of the present invention.

For example, the side wall 8 of the through hole 7 does not need to be continuously closed for its entire length. The wall 8 could present one or more apertures in its length or present a closed section only on a small part of its length, the essential characteristic of the invention being the fact that such a wall 8 presents a closed section for at least a part of its length.

What is claimed is:

1. An anti-friction bearing interposable at the crossing-over point between two spokes of a bicycle wheel, the bearing comprising: a body having opposed, spaced apart ends, a through hole extending for at least a portion of the body between the opposed ends and dimensioned to receive one of the two spokes, and a section, extending for at least a part of the length of the body, having a portion of an external surface thereof designed to come into contact with and receive the other one of the two spokes.

2. The bearing according to claim 1, wherein the body is made of a plastic material.

3. The bearing according to claim 1, wherein the portion of external surface defines a longitudinal groove that is angled with respect to the through hole by an angle corresponding to an angle defined at the crossing-over point of the two spokes.

4. The bearing according to claim 3, wherein the groove is delimited by two elastically deformable ribs that over lie the groove and define the depth of the groove.

5. The bearing according to claim 1, wherein the through hole has a cross-section with a profile corresponding to a cross-section of the respective spoke.

6. The bearing according to claim 5, wherein the profile of the cross-section is substantially ellipsoidal.

7. The bearing according to claim 5, wherein the profile of the cross-section is substantially cylindrical.

8. The bearing according to claim 1, wherein the through hole extends for substantially the entire space between the ends.

9. A spoked bicycle wheel comprising:
   a hub;
   a rim connected by a plurality of spokes, said plurality of spokes including a plurality of pairs of spokes having points of crossing over one another; and
   at least one bearing mounted at a crossing-over point of a pair of spokes wherein the bearing comprises a body having opposed, spaced apart ends, a through hole extending for at least a portion of the body between the opposed ends and dimensioned to receive one of the two spokes, and a section, extending for at least a part of the length of the body, having a portion of an external surface thereof designed to come into contact with and receive the other one of the two spokes at the cross over point.

10. A bearing for interposition between two crossing spokes of a wheel at their crossing-over point, the bearing comprising an elongated body having at least one aperture defined on a first side thereof which is configured to receive one of the two spokes and an external surface on a side opposite the first side that is configured for contact with the other of the two spokes.

11. The bearing of claim 10, wherein the aperture is defined along the entire elongated body.

12. The bearing of claim 10, wherein the external surface defines a longitudinal groove.

13. The bearing of claim 12, wherein deformable ribs are formed on the external surface adjacent to and over the groove.

14. The bearing of claim 13, wherein the deformable ribs are equal in length to the groove.

15. The bearing of claim 10, wherein the at least one aperture has a longitudinal axis and the external surface defines a groove which has a different longitudinal axis.

16. The bearing of claim 15, wherein the two longitudinal axes are off set from each other by less than ninety degrees.

17. A bearing for attachment between two crossing spokes of a bicycle wheel, the bearing comprising:
   a body;
   a through aperture located on the body, having a closed cross-section for at least a portion of a given length of the bearing, for permanently receiving a first spoke; and
   a groove located on the body, having an open cross-section, for releasably receiving a second spoke which crosses the first spoke.

18. The bearing according to claim 17, further comprising at least one elastically deformable rib which cooperates with the groove to securely attach the bearing to the second spoke.

19. A bearing for a pair of crossing spokes of a bicycle wheel, the bearing comprising:
   a body having lengthwise and widthwise dimensions at least equal to a distance defined by the spokes' crossing;
   a lengthwise aperture defined in the length of the body of sufficient cross-section for receiving therein a portion of a first spoke of the pair of crossing spokes; and,
   a widthwise groove disposed adjacent to and at an angle with respect to the lengthwise aperture for receiving therein a portion of a second spoke of the pair of crossing spokes.

20. The bearing according to claim 19, further comprising at least one elastically deformable rib which cooperates with the groove to securely attach the bearing to the second spoke.

21. A bearing for a pair of crossing spokes of a bicycle wheel, the bearing comprising:
   a body having a first side and a second side,
   the first side having a spoke receiving aperture in a first orientation to receive therein a portion of a first spoke of the pair of crossing spokes; and,
   the second side having a spoke receiving groove extending in a second orientation to receive therein a portion of a second spoke of the pair of crossing spokes;
   wherein the first and second orientations are at an angle with respect to each other.

22. The bearing according to claim 21, wherein the groove and the aperture include respective inside surfaces located substantially farthest from an exterior surface of the body, and wherein the respective inside surfaces lay substantially in a same plane at a crossing point of the spokes.

* * * * *